C. B. STREET.
Hydraulic-Hose.
No. 154,725.  Patented Sept. 1, 1874.
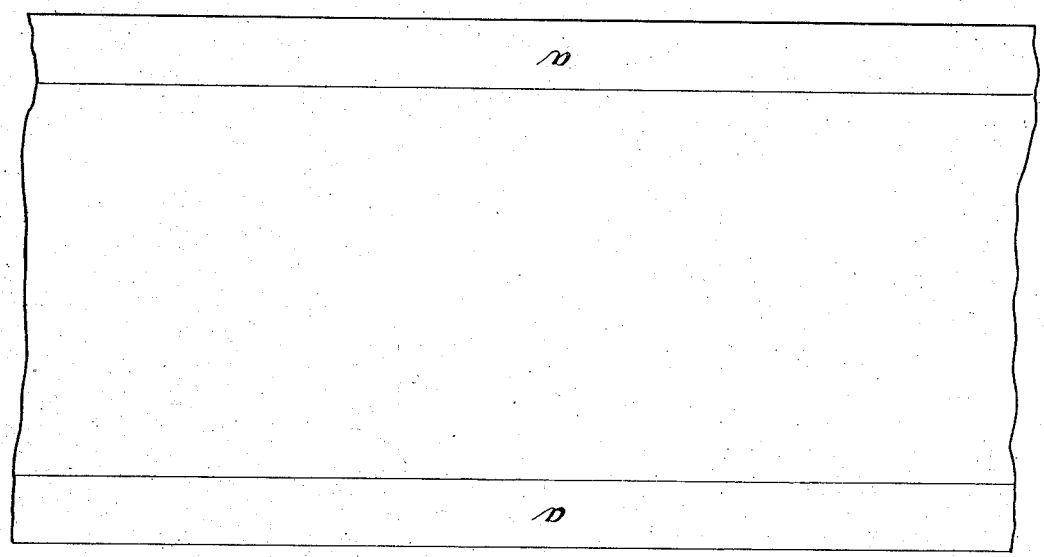
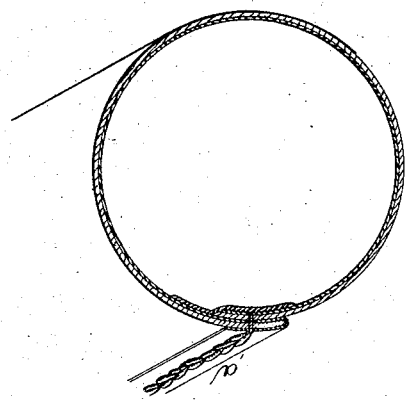
Witnesses
Jno. Q. Patten
Geo. T. Pinckard
Inventor
Charles B. Street.
per John J. Halstead.
Atty

UNITED STATES PATENT OFFICE.

CHARLES B. STREET, OF BOSTON, MASSACHUSETTS, ASSIGNOR TO
THEODORE A. DODGE, TRUSTEE, OF SAME PLACE.

IMPROVEMENT IN HYDRAULIC HOSE.

Specification forming part of Letters Patent No. 154,725, dated September 1, 1874; application filed June 9, 1874.

*To all whom it may concern:*

Be it known that I, CHARLES B. STREET, of Boston, in the county of Suffolk and State of Massachusetts, have invented an Improvement in Hydraulic Hose; and I do hereby declare that the following, taken in connection with the drawings which accompany and form part of this specification, is a description of my invention sufficient to enable those skilled in the art to practice it.

In the manufacture of hydraulic hose, where each section of hose is formed of a woven strip, having its edges lapped and united by suitable fastenings, it has been found necessary to have the edge which is outside a selvage, so as not to be liable to fraying; and generally, especially where there is much pressure to be borne by the hose, both edges have been made with a selvage, so that the lateral strain on the fastenings shall not separate the warp from the filling, as would be the case if the edges were raw or cut. This necessitates the weaving of narrow strips, costing very much more than strips of equal width cut from a wide piece of woven fabric. Hence, any means of strengthening the raw edges of a strip so cut from a wide piece results in very considerable saving, and an equally good article can be given to the public at a reduced cost.

I prefer to strengthen the raw edges of my strip by cementing about each edge a narrow piece of thin fabric, coated on both sides with rubber, known as rubber sheeting, as shown in the drawing attached hereto; but any other suitable material may be used. The piece thus cemented about the edge may be made of such rubber sheeting unvulcanized, and, after using any fluid that will cut the rubber, such as benzine or naphtha, pressure will cause the edging to adhere firmly. The process of vulcanization, being performed afterward, makes the edging adhere permanently to the woven or rubber-lined woven strip.

Both raw edges of the strip may be thus protected; but, in practice, I prefer to so protect only the outer edge; and, by the use of an inner welt cemented over the fastenings and juncture, the inner raw edge is sufficiently protected. The row or rows of fastenings may either or both pass through this edging, thus retaining it in place the more firmly.

By this means a number of strips for forming hose may be made from one width of woven fabric at a very great saving, the hose thus made being equally good as if it had one or more selvages.

The result of cementing on this edging over a raw edge is to hold the threads of the warp closely together, and prevent lateral strain from any source, or wear, from separating them from the woof or filling, or from fraying.

Such an edging may be applied successfully to belting, or any other manufacture made of woven fabric, where such edging may be useful.

The drawing shows a piece of a strip for forming hose on which this edging has been placed, *a a* denoting such edging; also a piece of hose made from such a strip, in outside view and section.

I claim—

Hydraulic hose made of a strip of woven fabric, lined or unlined with water-proof material, in which the edges are protected, substantially as described.

CHARLES B. STREET.

Witnesses:
M. W. FROTHINGHAM,
C. WARREN BROWN.